United States Patent
Buchanan et al.

[11] 3,829,700
[45] Aug. 13, 1974

[54] RARE EARTH PHOSPHORS FOR X-RAY CONVERSION SCREENS

[76] Inventors: Robert A. Buchanan, 4022 Ben Lomond, Palo Alto, Calif. 94306; Melvin Tecotzky, 27 N. Linden Ln., Mendham, N.J. 07945; Kenneth A. Wickersheim, 3893 Middlefield Rd., Palo Alto, Calif. 94303

[22] Filed: Nov. 24, 1972

[21] Appl. No.: 309,496

Related U.S. Application Data

[63] Continuation of Ser. No. 110,442, Jan. 28, 1971, Pat. No. 3,725,704.

[52] U.S. Cl. ............................ 250/483, 252/301.4 S
[51] Int. Cl. ............................................. H01j 1/62
[58] Field of Search......250/80, 71R, 213 VT, 483; 252/301.4 S

[56] References Cited
UNITED STATES PATENTS
3,563,909  2/1971  Schuil et al. ................. 252/301.4 S

*Primary Examiner*—James W. Lawrence
*Assistant Examiner*—Davis L. Willis
*Attorney, Agent, or Firm*—Billy G. Corber; Richard H. Bryer

[57] ABSTRACT

This invention relates to phosphor screens for converting x-rays to visible or near visible radiation and phosphor materials used in such screens. More particularly, the x-ray conversion screens are of the type used, for example, in fluoroscopy, film intensifiers and x-ray image intensifier tubes and the phosphor materials are oxysulfides of lanthanum, gadolinium or lutetium activated with trivalent terbium.

9 Claims, 3 Drawing Figures

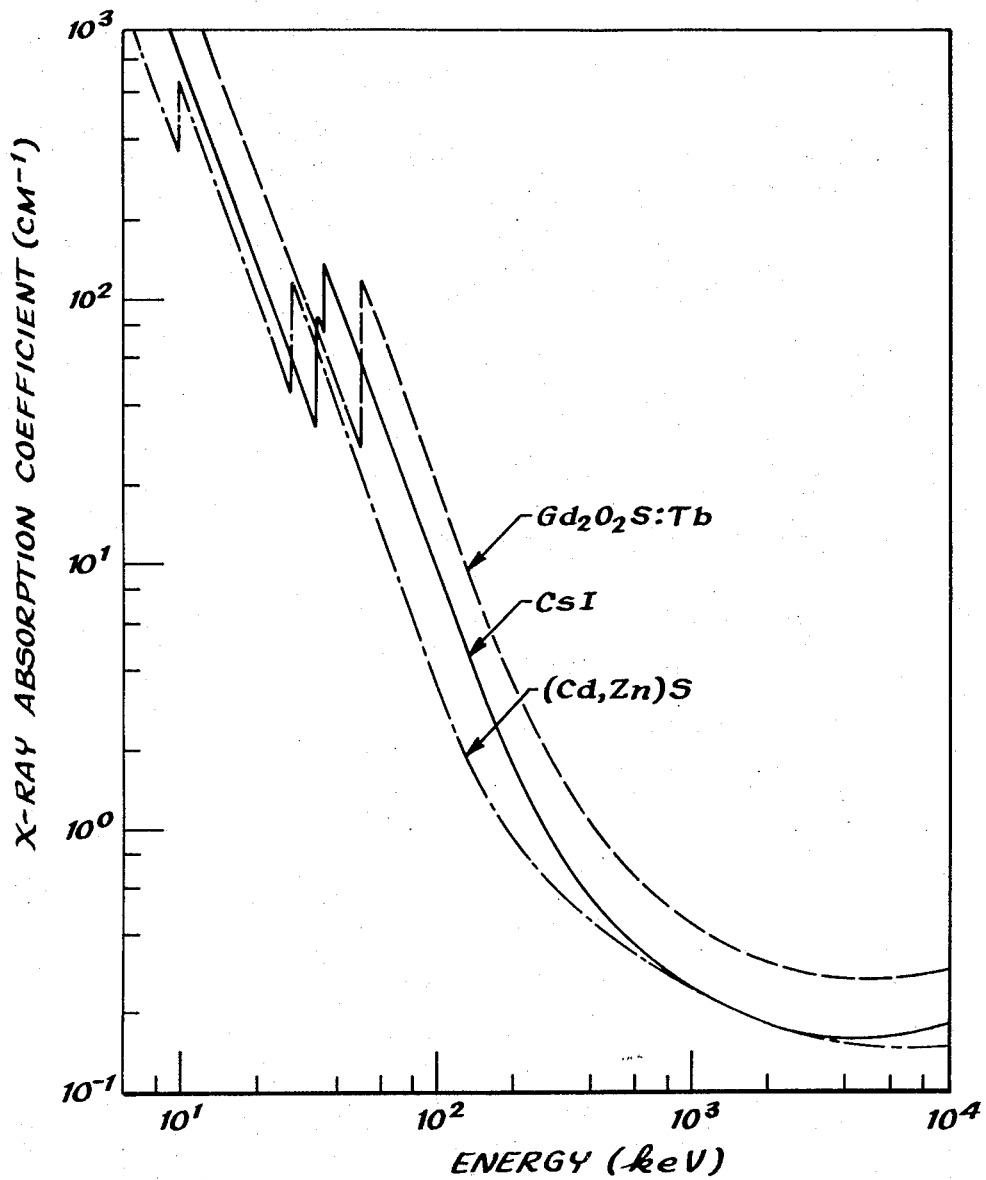
FIG_2
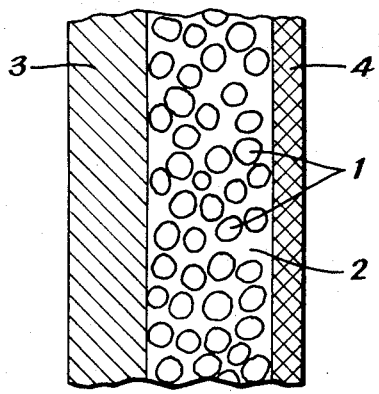
FIG_1

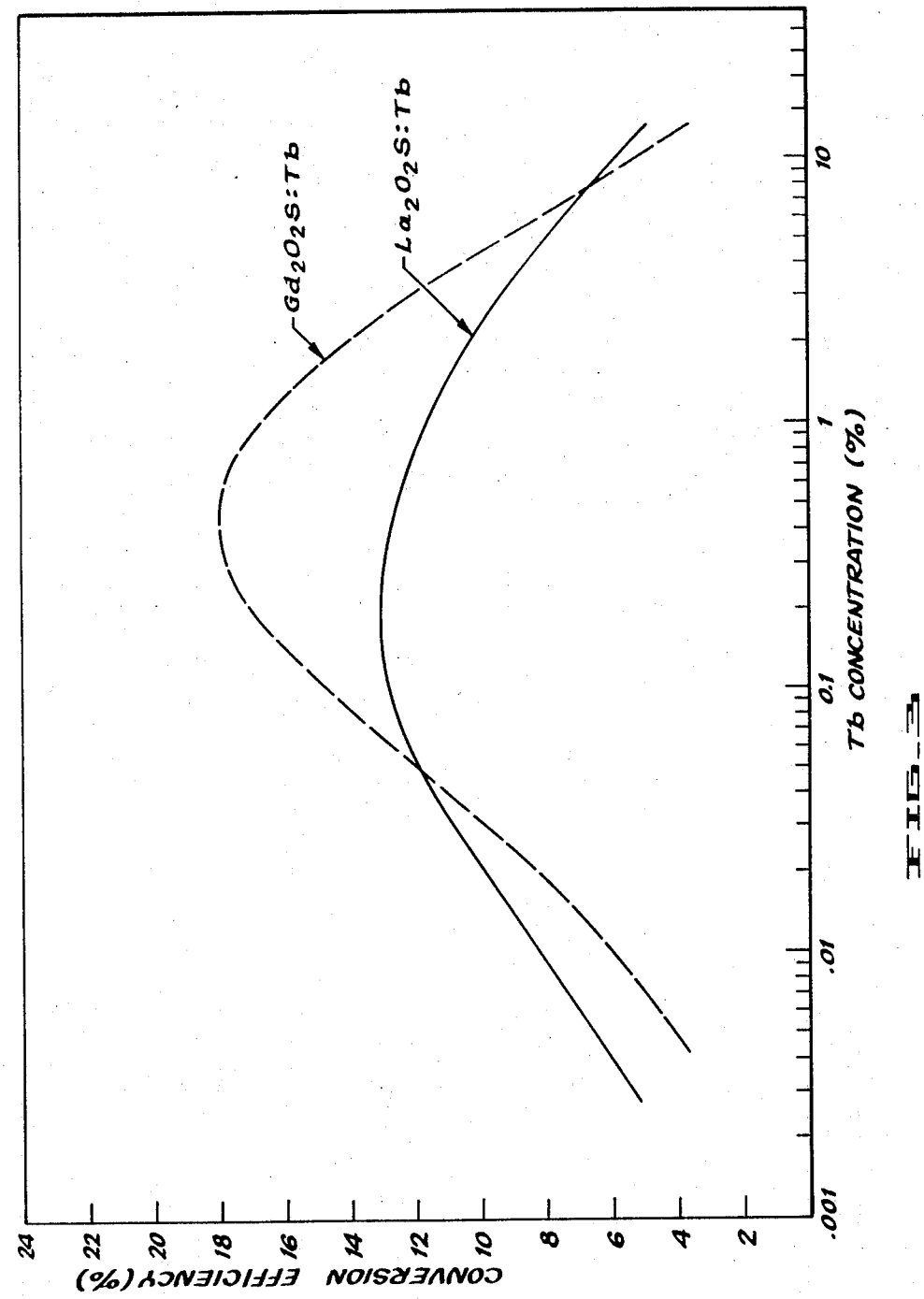

RARE EARTH PHOSPHORS FOR X-RAY CONVERSION SCREENS

CROSS-REFERENCE TO RELATED APPLICATION

This application is a continuing application of copending United States patent application Ser. No. 110,442 filed Jan. 28, 1971, which issued Apr. 3, 1973 as U.S. Pat. No. 3,725,704.

BACKGROUND OF THE INVENTION

The invention described herein was made in the course of, or under, Contract No. AT(04-3)-674 with the United States Atomic Energy Commission. Since shortly after the discovery of x-rays, the phosphor screen has been used to convert x-ray images to visible or near-visible images. The key constituent of an x-ray conversion screen is a phosphor material which absorbs incident x-ray photons and produces in their stead photons of visible or near-visible energy. Such screens are now used widely in industry and medicine. In all applications, the screen is placed directly in the x-ray beam. The fluoroscopic screen is a free-standing screen which is viewed directly or photographed with either a film camera or a television camera. The film intensifying screen is mounted in a cassette and comes into immediate contact with a sheet of film. The films used respond more sensitively to the light emitted by the phosphor screen than they do to the x-rays and thus an "intensified" image is produced on the film. The input screens used in x-ray converter tubes or x-ray image intensifier tubes perform the same function except that the light emitted by the screen when it absorbs an x-ray is made to fall on a photocathode sensitive to the visible or near visible phosphor radiation. The photocathode emits photoelectrons which are then accelerated electrically in the vacuum of the tube and are then refocused on an output screen containing a cathode ray phosphor which in turn emits light. An intensified image much like the image produced by a television tube, is thus produced on the output screen.

To be useful in such screens, the x-ray phosphor material must stop x-rays effectively and must convert efficiently the absorbed x-ray energy into visible or near visible radiation. Thus the ideal phosphor material should have both a high x-ray absorption coefficient and a high x-ray conversion efficiency.

To date, only three phosphors out of the thousands available to the art are generally utilized in x-ray conversion screens: calcium tungstate ($CaWO_4$); cadmium-zinc sulfide powders, typically ($Cd_{0.5}Zn_{0.5}$)S:Ag; and cesium iodide (CsI). These phosphors, however, have serious disadvantages. Calcium tungstate, widely used in film intensifying screens, has a high x-ray absorption coefficient but its conversion efficiency is quite low, being typically only three percent. Cadmium-zinc sulfide powders, used in fluoroscope screens and x-ray image intensifier tubes, has high conversion efficiency, typically about 20 percent, but, as is shown in FIG. 2 of the drawing, its x-ray absorption coefficient is quite low over most of the x-ray energy range of interest. Recently, cesium iodide has been utilized in image intensifier tubes. However, this material has both an x-ray absorption coefficient and a conversion efficiency only intermediate those of $CaWO_4$ and ($Cd_{0.5}Zn_{0.5}$)S:Ag and accordingly suffers the same disadvantages as the aforesaid materials. Thus, none of the materials now utilized by the art exhibits the desired combination of both high x-ray absorption coefficient and high conversion efficiency.

Attempts by the art to identify other potential x-ray conversion screen phosphors have not been successful. For example, consideration has been given to rare earth phosphors but in view of the results reported in U.S. Pat. No. 3,403,279, this class of phosphors did not have characteristics warranting their replacing the phosphors now utilized by the art. This patent describes a series of phosphor compounds for use in conversion screens of x-ray intensifier tubes. The compounds are all lanthanum compounds, specifically, lanthanum oxide, lanthanum silicate and lanthanum phosphate activated with terbium. These materials have reasonably high x-ray absorption coefficients but, in common with $CaWO_4$, suffer the serious disadvantage of having low conversion efficiencies, in the order of three percent to 6 percent.

The thickness of x-ray conversion screens is frequently limited by resolution requirements. Screens in x-ray image intensifier tubes, for example, may be only one to 200 microns thick. In such thin screens the largest fraction of incident x-rays may pass through the screens without being absorbed and converted. Increasing the stopping power of the phosphor increases the fraction of the x-rays utilized. Keeping the quantum conversion efficiency high guarantees that a larger fraction of x-ray absorption events will be recorded. Gains in x-ray utilization can then be used to allow either a total increase in image brightness at the same x-ray dosage or, conversely, the x-ray dosage can be reduced without loss in data content.

SUMMARY OF THE INVENTION

Briefly, in accordance with the invention, it has been discovered that a particular oxysulfide phosphor exhibits new and unobvious properties which make it uniquely suitable for use in x-ray conversion screens. The phosphor has the composition $(RE)_2O_2S$:Tb wherein RE is lanthanum, gadolinium and lutetium and in which form about 0.005 percent to 8 percent of the trivalent host metal ions have been replaced by trivalent terbium ions.

Conversion screens utilizing the composition of the invention, when placed in an x-ray beam, absorb x-ray photons and produce in their stead radiation principally in the blue and green region of the visible spectrum. The combination of both x-ray absorption and x-ray to light conversion efficiency of the compositions and screens of the invention is uniquely high as compared to other state-of-the-art materials and screens. The screens of this invention may be free-standing as in fluoroscope screens, mounted in a cassette and placed in direct contact with x-ray or photographic film as in intensifying screens, or supported in an evacuated tube in such a way as to allow the light produced to generate photoelectrons from a photocathode, these photoelectrons then being accelerated and reimaged onto a light-producing output screen as in x-ray image intensifier tubes.

The screens of the invention are particularly suited for use in the x-ray range which extends from about 50 ke V to 150 ke V. However, there are applications at lower and higher x-ray energies which can utilize the screens.

A comparison of the x-ray absorption coefficient of various compositions of the invention with prior art materials is set forth in Table 1.

TABLE 1

| | x-ray absorption coefficient at 100 keV in cm$^{-1}$ |
|---|---|
| $(Cd_{0.5}Zn_{0.5})S:Ag$ | 3.5 |
| CsI | 9 |
| $CaWO_4$ | 17.5 |
| $La_2O_2S:Tb$ | 10.5 |
| $Gd_2O_2S:Tb$ | 18.3 |
| $Lu_2O_2S:Tb$ | 29 |

The terbium ion, in the compositions of the invention, exhibits exceptionally intense emission under both electron and x-ray excitation as compared with the materials described in U.S. Pat. No. 3,403,279. For example, efficiencies as high as eighteen percent have been observed under electron excitation for particular compositions of the terbium activated gadolinium oxysulfide. This efficiency approximates that of the cadmium-zinc sulfide material but in a material of the invention having a much larger absorption coefficient than the cadmium-zinc sulfide material.

It has been determined that there is a fairly general parallelism between electron and x-ray efficiencies which has proven very useful. This parallelism has been supported by the performance of screens made from the terbium activated phosphors when excited alternatively by electrons and by x-rays. Accordingly, electron excitation data is used interchangeably herein with x-ay excitation data when numerical comparisons are made since quantitative electron measurements of phosphors are somewhat easier to obtain and are thus sometimes better known. However, in all instances, actual performance advantages have also been verified under x-ray excitation.

The efficiencies of the terbium activated oxysulfides of lanthanum and gadolinium are from three to six times greater than materials described in U.S. Pat. No. 3,403,279, from four to six times greater than $CaWO_4$, and from thirty percent to eighty percent greater than CsI. The x-ray absorption coefficient of lanthanum oxysulfide is three times that of the cadmium-zinc sulfide over the majority of the x-ray range of interest, is somewhat superior to that of CsI above 39 keV and essentially equivalent to that of the materials described in U.S. Pat. No. 3,403,279. Gadolinium oxysulfide has an even greater absorption coefficient than lanthanum oxysulfide, being almost two times greater above 50 keV. The absorption coefficient of lutetium oxysulfide is almost three times greater than lanthanum oxysulfide. It is readily apparent, therefore, that the compositions of the invention exhibit a combination of high absorption coefficients; i.e., x-ray stopping power, and high efficiencies that are unique in the art. That applicants' phosphor out of the thousands of materials known to the art would exhibit such unexpected properties is unobvious since there is no way to predict a priori what materials should even be initially surveyed. For example, U.S. Pat. Nos. 3,418,246 and 3,418,247, while disclosing various terbium activated oxysulfides as television and cathode-ray phosphors, are completely devoid of any teaching that the phosphors recited therein would have x-ray conversion screen properties, much less that such phosphors would, in fact, exhibit such outstanding x-ray properties. The art is even more remote, in fact, as concerns the uniqueness of the compositions of the invention for x-ray conversion screen purposes in view of U.S. Pat. No. 3,403,279. As previously discussed, this patent discloses a rare-earth phosphor, and in particular a phosphor having a lanthanum-terbium combination, and attributes properties to this phosphor that for x-ray purposes are marginal at best. This phosphor has not, to applicants' knowledge, gained commercial acceptance; the art in fact has recently introduced CsI as a x-ray phosphor. Thus, the art does not teach the suitability of applicants' rare-earth phosphor as an x-ray phosphor and in fact has turned away from such phosphors.

Secondary advantages of the compositions of the invention include their stability in the presence of atmospheric moisture compared, say, with CsI, their relative chemical inertness under most forms of screen processing, and their insensitivity to poisoning by other screen or tube constituents.

Yet another feature of the compositions of the invention is that they all have the same crystal structure. Thus, unlike the majority of other rare earth compounds, including for example the oxides, any solid solution of rare earth oxysulfides of the invention can be easily produced without drastic alteration of optical characteristics. While the net emission color can shift somewhat for a given activator in a different oxysulfide host, or at different activator concentration levels, any activator concentration can be produced as can any solid solution of hosts. Accordingly, solid solutions of the lanthanum, gadolinium and lutetium host materials of the invention are achievable and are useful compositions.

While optimum concentrations of terbium vary somewhat from one oxysulfide host material of the invention to another, the useful range of terbium substitution for the host metal ion has been found to be between about 0.005 percent and 8 percent. Superior performance is evidenced by terbium concentrations from about 0.01 percent to five percent and optimum performance is typically achieved for terbium concentrations of from about 0.03 percent to three percent.

BRIEF DESCRIPTION OF THE DRAWING

The invention may be more easily understood from the following description and accompanying drawing in which:

FIG. 1 is a cross sectional view of an x-ray conversion screen utilizing the compositions of the invention;

FIG. 2, on coordinates of x-ray absorption coefficient in cm$^{-1}$ and x-ray energy in keV, is a logarithmic plot of the x-ray stopping power of several compositions of the invention as compared to prior art materials; and FIG. 3, on coordinates of percent conversion efficiency versus the percentage replacement of the host metal ions by terbium, is a semi-log plot showing the conversion efficiency of terbium-activated lanthanum oxysulfide and terbium-activated gadolinium oxysulfide as a function of terbium content of the two phosphors.

DESCRIPTION OF THE PREFERRED EMBODIMENTS

Referring more particularly to FIG. 1 there is shown a typical x-ray conversion screen. The phosphor particles 1 are held together and formed into a smooth layer by a binder 2. Since the binder also serves as part of the light transmitting screen it should be transparent to the emitted radiation and should have as high an index of refraction as possible to better match the high index (greater than 2) of the phosphor of the invention; otherwise scattering losses in the screen may become excessive. Typical binders known to the art are plastics, glasses and resins. Other factors affecting scattering losses are the particle-size of the phosphors and the total thickness of the screen. Thickness requirements are usually set by resolution considerations. Best screen transmission is then typically obtained using particles which are well formed crystals of a dimension which is a reasonable fraction of the screen thickness. For example, a film intensifier screen having a thickness of 125 microns uses typically phosphor particles of about 10 microns, an x-ray image intensifier tube screen of 200 micron thickness uses typically phosphor particles of about 20 microns, and a fluoroscope screen of 400 micron thickness uses typically phosphor particles of about 40 microns. The screen, consisting of phosphor and binder is generally formed on a supporting substrate 3 which, depending on the application, can be, for example, plastic, glass, or aluminum. Layer 4 represents a protective film on an intensifying screen, or alternatively, a cathode in an image intensifier tube. The screen can be either flat or curved depending on the application. An x-ray image converter tube is shown in more detail in U.S. Pat. No. 3,403,279 referenced earlier. Typical fluoroscopic screens and intensifying screens are shown in United States Radium Corporation's Bulletin No. 70.12 entitled "X-Ray Screens."

In FIG. 2 there are shown typical x-ray absorption curves for a phosphor of the invention and for typical phosphors of the art. The scales are logarithmic to cover the wide variations in x-ray energy and absorption. As can be seen, the absorption of the $Gd_2O_2S$:Tb phosphor of the invention is a factor of two greater than CsI and as much as a factor of five times greater than (Cd,Zn)S over the 50 keV to 150 keV range.

As further shown by FIG. 2, all phosphors show "edges" where there is an abrupt change in x-ray absorption at energies corresponding to the onset of the promotion of electrons out of deep inner electron shells of the host metal ions. For lanthanum, the uppermost edge falls at 38 keV, for gadolinium at 50 keV, for lutetium at 63 keV and for $CaWO_4$ at 70 keV. For lower energy x-ray applications the position of this edge may be important and may in fact dictate which of the several phosphors of the invention is the most appropriate.

The curves set forth in FIG. 2 were calculated in accordance with the techniques set forth in Robley D. Evans, "The Atomic Nucleus," McGraw Hill, 1955, pg. 714, and utilizing the data provided by Warren D. Brown in "X-Ray Attenuation and Absorption Coefficients," the Boeing Company, BOAC D2-125065-1.

Although not plotted, it has been determined that the absorption coefficient curves for lanthanum and lutetium oxysulfides parallel the plotted gadolinium oxysulfide curve above the edge set forth above, the relationships over this range being as indicated for 100 keV in Table 1.

In FIG. 3 there are shown typical plots of conversion efficiencies for different concentrations of terbium in lanthanum and gadolinium oxysulfide. The plots were obtained by exciting the phosphors with electrons and were confirmed by subsequent x-ray measurements. In view of the crystal structure of lutetium oxysulfide previously discussed, the curve for the lutetium oxysulfide phosphor of the invention would be comparable to the plotted curves.

As seen from the figure, the emission intensity maximizes at about 0.03 percent to three percent terbium replacement of lanthanum and gadolinium and is the optimum range for maximizing x-ray conversion efficiency. The minimum efficiency of this range is about 9.3 percent. At the lower concentration limit, gadolinium has an efficiency of about 9.7 percent and lanthanum has an efficiency of about 10.7 percent. At the upper concentration limit, gadolinium has an efficiency of about 12.2 percent and lanthanum has an efficiency of about 9.3 percent.

A practical terbium concentration range for the compositions of the invention is from about 0.005 percent to about 8 percent terbium. The minimum efficiency of this range is about 4 percent. At the lower concentration limit, gadolinium has an efficiency of about 4 percent and lanthanum has an efficiency of about 6.5 percent. At the upper concentration limit, gadolinium has an efficiency of about 6.5 percent and lanthanum has an efficiency of about 6.5 percent.

A preferred terbium concentration range is from about 0.01 percent to 5 percent terbium. The minimum efficiency of this range is about 6 percent. At the lower concentration limit, gadolinium has an efficiency of about 6 percent and lanthanum has an efficiency of about 8 percent. At the upper concentration limit, gadolinium has an efficiency of about 9 percent and lanthanum has an efficiency of about 8 percent.

Within the above ranges, a lanthanum oxysulfide phosphor in which about 0.2 percent of the lanthanum ions have been replaced by terbium ions exhibits an efficiency of about 13 percent; a gadolinium oxysulfide phosphor in which about 0.5 percent of the gadolinium ions have been replaced by terbium ions exhibits an efficiency of about 18 percent.

The particular choice of the host material is influenced by a variety of considerations including cost, conversion efficiency, x-ray absorption, position of the x-ray absorption edge and the color of the emission for a given terbium concentration, the color being somewhat greener at high concentrations and bluer at low concentrations. Since the host materials of the invention are closely related chemically and structurally, solid solutions of the host materials can be formed and such solid solutions may be preferred for particular applications. Likewise, the use of mixtures of the host materials may be dictated by a particular application. Accordingly, solid solutions and mixtures of the compositions of the invention are within the scope of the invention.

The compositions of the invention are conveniently prepared by the several processes described in U.S. Pat. Nos. 3,418,246, 3,418,247 and 3,515,675.

Specific examples of devices and compositions of the invention are given below. These examples are to be construed as illustrative only and not limiting in any manner the scope and spirit of the invention as defined by the appended claims.

Example 1

A phosphor having the final composition $La_{1.996}Tb_{0.004}O_2S$ (0.2 percent replacement of lanthanum by terbium) was prepared by the process of U.S. Pat. No. 3,515,675 modified to use terbium in place of europium. The product was a powder having an off-white body color which was photoluminescent, x-ray luminescent and cathodoluminescent and having emission lines between 5,400A and 5,500A with other groups of emission lines near 4,900A, 5,850A and 6,200A. The efficiency of this phosphor under electron excitation was approximately 13 percent. When made into a screen and excited by x-rays this phosphor emitted the same emission spectrum described above, with comparable high efficiency.

Example 2

A phosphor having the final compositions $Gd_{1.99}Tb_{0.01}O_2S$ (0.5 percent replacement of gadolinium by terbium) was prepared by the process of U.S. Pat. No. 3,515,675 modified to use terbium in place of europium and gadolinium in place of lanthanum. The product was an off-white powder which was luminescent under ultraviolet, cathode ray and x-ray excitation, the emission being un unsaturated blue-green with principal emission lines near 4,200A, 4,350A, 4,900A, 5,450A, 5,900A and 6,250A. While the wavelengths of these lines are similar to those of the phosphor of Example 1, the relative intensities are altered as is therefore the net emission color as interpreted by the eye. The efficiency of this phosphor as measured under electron excitation was approximately 18 percent. When made into a screen and excited by x-rays, this phosphor emitted the same emission spectrum described above with comparable high efficiency.

What is claimed is:

1. A method of converting an x-ray energy field into radiation principally in the blue and green region of the visible spectrum comprising the steps of, (a) positioning in said x-ray field a phosphor consisting essentially of at least one oxysulfide selected from the group consisting of lanthanum oxysulfide, gadolinium oxysulfide and lutetium oxysulfide in which from about 0.005 percent to 8 percent of the host metal ions have been replaced by trivalent terbium ions, and (b) irradiating said phosphor with said X-ray energy field, thereby to convert the x-ray energy into said visible radiation.

2. A method in accordance with claim 1 wherein from about 0.01 percent to 5 percent of the host metal ions have been replaced by trivalent terbium ions.

3. A method in accordance with claim 1 wherein from about 0.03 percent to 3 percent of the host metal ions have been replaced by trivalent terbium ions.

4. A method in accordance with claim 1 which comprises the further step of positioning a visible light detector in the path of said visible radiation.

5. A method in accordance with claim 4 wherein the step of positioning a detector comprises positioning a photosensitive film in the path of said visible radiation, whereby a record of an image carried by said x-ray energy is formed for later viewing in the visible energy spectrum.

6. A method in accordance with claim 4 wherein the step of positioning a detector comprises the step of intensifying the visible radiation by positioning a photocathode in the path thereof which emits photoelectrons that are accelerated and refocused on a cathode ray phosphor.

7. A method in accordance with claim 1 wherein the phosphor positioning step comprises positioning in said x-ray field a thin layer consisting essentially of at least one oxysulfide phosphor selected from the group consisting of lanthanum oxysulfide, gadolinium oxysulfide and lutetium oxysulfide in which from about 0.005 percent to 8 percent of the host metal ions have been replaced by trivalent terbium ions.

8. A method in accordance with claim 1 wherein the phosphor positioning step comprises positioning in said x-ray field a phosphor consisting essentially of lanthanum oxysulfide to the exclusion of other phosphors.

9. A method in accordance with claim 1 wherein the phosphor positioning step comprises positioning in said x-ray field a phosphor consisting essentially of gadolinium oxysulfide to the exclusion of other phosphors.

* * * * *